US 6,715,109 B1

(12) United States Patent
Charlet et al.

(10) Patent No.: US 6,715,109 B1
(45) Date of Patent: Mar. 30, 2004

(54) METHOD, COMPUTER PROGRAM PRODUCT, AND SYSTEM FOR MAKING STANDARD STREAM DATA ACCESSIBLE THAT WOULD OTHERWISE BE LOST IN APPLICATION PROGRAMS

(75) Inventors: Kyle J. Charlet, Morgan Hill, CA (US); Greg S. Kim, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,054

(22) Filed: Feb. 4, 2000

(51) Int. Cl.[7] .................................................. G06F 11/00
(52) U.S. Cl. ........................... 714/38; 714/46; 717/124; 717/125
(58) Field of Search ............. 714/57, 46, 38; 717/124, 125, 110; 709/315

(56) References Cited

U.S. PATENT DOCUMENTS

| | | | |
|---|---|---|---|
| 4,792,918 A | 12/1988 | Hirase et al. ............... 364/900 |
| 5,438,574 A | 8/1995 | Taniguchi ............... 395/183.14 |
| 5,583,988 A | 12/1996 | Crank et al. ............ 395/185.01 |
| 5,673,390 A | 9/1997 | Mueller ................... 395/185.1 |
| 5,701,487 A | 12/1997 | Arbouzov ................... 395/704 |
| 5,845,120 A | * 12/1998 | Reddy et al. ............... 707/513 |
| 5,881,289 A | 3/1999 | Duggan et al. ............. 395/705 |
| 5,892,898 A | * 4/1999 | Fujii et al. ..................... 714/57 |
| 5,905,892 A | 5/1999 | Nielsen et al. ............. 395/705 |
| 5,946,488 A | 8/1999 | Tanguay et al. ............ 395/705 |
| 6,094,529 A | * 7/2000 | Jeffries et al. ............. 345/744 |
| 6,115,544 A | * 9/2000 | Mueller ........................ 714/48 |
| 6,128,011 A | * 10/2000 | Peng ........................... 345/744 |
| 6,411,974 B1 | * 6/2002 | Graham et al. ............. 707/531 |

OTHER PUBLICATIONS

Javac—Java programming language compiler, Sun Microsystems.*
Roedy Green, Java Glossary: javac.exe, Canadian Mind Products.*
JavaDepend, http://ptolemy.eecs.berkely.edu/~cxh/java/javadepend.*
Jonathan B. Rosenberg, How Debuggers Work, 1996, John Wiley & Sons Inc., pp. 77 and 188–189.*
G.D. Boldt, et al., "Blocking Modal Dialog Support for Java", IBM Technical Disclosure Bulletin, vol. 40, No. 04, Apr. 1997. pp. 151–152.

* cited by examiner

Primary Examiner—Robert Beausoliel
Assistant Examiner—Marc Duncan
(74) Attorney, Agent, or Firm—Fay, Sharpe, Fagan, Minnich & McKee, LLP (57) ABSTRACT

A method, computer program product, and system for making standard stream data accessible that would otherwise be lost in applications programs. Information placed on a standard stream, such as System.err or System.out in the Java development environment, can be lost during normal operation of the program (e.g., when not started from a system console or within an Integrated Development Environment (IDE)). A new stream is created and the standard stream is redirected to the new stream. Once data placed on the standard stream is available on the new stream it can be manipulated as desired and made available through a console or by placing the information into a file.

41 Claims, 3 Drawing Sheets

METHOD, COMPUTER PROGRAM PRODUCT, AND SYSTEM FOR MAKING STANDARD STREAM DATA ACCESSIBLE THAT WOULD OTHERWISE BE LOST IN APPLICATION PROGRAMS

BACKGROUND OF THE INVENTION

1. Field of the Invention.

The present invention relates to methods of debugging application programs that use the standard output and standard error streams. More particularly, the present invention is related to ways of capturing standard error information from an application program written in the Java programming language.

2. Present State of the Art.

Currently, most application program development is done in a high level programming language, such as C++ or Java, in an IDE. An IDE provides many debugging capabilities, such as stepping through the execution of a program while simultaneously observing the point of execution in source code. One such ability is to capture the standard error messages delivered through System.err (Java) or stderr © and C++). When errors are manifest through these standard streams, they are captured by the IDE and can be observed by the developer as an aid in debugging. Furthermore, when a program is started from system console, the information from the standard streams is available to a user at the system console.

There are situations that arise where the standard stream information can be lost to the user. The present invention is directed to providing a way to capture and make accessible to a user the information from the standard stream that would otherwise be lost.

One situation where standard streams information is lost occurs in GUI environment (outside the IDE) where error information may be lost from the standard streams since the streams are designed to output information into a character-based display mechanism such as a CRT display of a "dumb" terminal, a DOS prompt, on a UNIX shell interpreter, etc. In a GUI environment, applications are started or "launched" by selecting (e.g., operating a mouse so as to manipulate a cursor over the icon or menu item) an icon representative of the application and initiating the action (e.g., by "clicking" the mouse or hitting "enter"). Therefore, in the designated environment for application program deployment (e.g., the Windows desktop), there is no inherent mechanism for capturing the error message information for use by the user of the program and it becomes irretrievably lost.

It is desirable to have this information for debugging purposes, particularly when the application program is released from development in early field testing or in a product offering. If there are errors reported through the standard streams, they would be available to product support as additional (and highly useful) information used to resolve the problem.

This error information is especially relevant for Java programs as a "stack trace" API call can be invoked when an error occurs. The output of the "stack trace" API call is sent to System.err and gives the entire invocation stack of the application program at the time of error. This in turn is highly useful information since the location in the program execution at the time of the error can then be determined.

One way currently used to ameliorate this problem involves the use of a system console, such as a DOS prompt in Windows. The system console itself is first started, and within that console the name of the program may be specified on the character interface to launch the application program. The application program will start and run normally, however, any error information (or other information on the standard streams) will be presented on the system console.

While use of the system console as described above is acceptable in some circumstances, it is limited use in many practical situations. For example, some errors occur infrequently and having the added overhead of starting the program in a user console every time adds to the difficulty of resolving the problem. This is especially so when the application is deployed in the field. In other words, it would be better to have a console directly part of the actual application program.

Furthermore, depending on the internal organization of an application program, using the system console as described above will not work. For example, when the original application program spawns an independent process (i.e., one where the original process does not wait for the child to complete before continuing forward with processing), error messages and other information written to the standard streams is lost as to the independent processes because the system console will only receive error messages for the original process. It is relatively common in an application program of even medium complexity to have many different processes running independently.

Finally, there are yet other situations that may commonly arise where the information written to the standard streams may not be available to a user of an application program. What is needed is a convenient way to make standard stream information accessible to users for informational and debugging purposes in those situations where the information would otherwise be lost.

SUMMARY OF THE INVENTION

An object of the present invention is to provide an easy mechanism that allows error or other information placed onto a standard stream in a development environment (e.g., System.err or System.out in the Java development environment) accessible in situations when it would otherwise be lost.

Additional objects and advantages of the present invention will be realized from the following description that follows by those skilled in the art or may be learned by practicing the invention. The objects and advantages of the present invention may be obtained by the ways shown and as particularly pointed out in the appended claims.

To achieve the foregoing objects, and in accordance with the invention as embodied and broadly described herein, a method, computer program product, and system for making standard stream data accessible that would otherwise be lost in applications programs is provided.

Information placed on a standard stream, such as System.err or System.out in the Java development environment, can be lost during normal operation of the program (e.g., when not started from a system console or within an Integrated Development Environment (IDE)). A new stream is created and the standard stream is redirected to this new stream. Once data placed on the standard stream is available on the new stream it can be manipulated as desired and made available through a console or by placing the information into a file.

Essentially, the standard stream is "observed" or monitored by a group of observers, each implementing a common interface method that is called upon when any new data is written to the standard stream. The implementation of an observer may, for example, capture the data and display it on a console or write it into a log file for future reference.

In other words, information being carried by the standard stream is monitored or observed by attaching to the standard stream and listening for data carried thereon. It is then made available by capturing the data and displaying it on a console, putting it into a file for future reference, etc.

BRIEF DESCRIPTION OF THE DRAWINGS

A more particular description of the invention briefly described above will be rendered by reference to specific embodiments thereof which are illustrated in the appended drawings. These drawings depict only one or more typical embodiments of the invention and are not therefore to be considered to be limiting of its scope. With respect to the following drawings, like reference numbers denotes the same element throughout the set of drawings.

DETAILED DESCRIPTION OF THE INVENTION

As used herein, the term "application program" refers to executable code such as a .exe file, Java applet or servlet, interpreted script, etc.

As used herein, the term "textual output information" typically refers to ASCII character data generated by an application program.

As used herein, the term "Graphical User Interface (GUI) environment" refers to an environment characterized by using a pointing device, such as a mouse, to manipulate a pointer, such as a cursor, over relevant visual graphics on a computer display and causing action by selection of the graphic, such as by clicking on a mouse button. Application programs are represented, either directly or indirectly (shortcuts), by icons and that when selected causes the application program to "launch" or begin running. Examples include the Microsoft Windows environment or the X Windows/Motif environment for UNIX-based systems.

As used herein, the term "Integrated Development Environment (IDE) refers to a development environment where a an application program under development is launched with a variety of debugging overhead. Typically, in a JAVA IDE, such as Visual Cafe from Symantec Corporation or Visual Age from IBM Corporation, textual output information that goes through the standard streams of System.err and System.out is captured and displayed for debugging purposes. This allows errors to be seen by the developer and print statements to also be used by the developer as a rudimentary, but sometime very effective, form of debugging.

As used herein, the term "system console" refers to a textual interface provided by a GUI environment having a visual display window that allows characters to be displayed that are generated by the keyboard, system, programs, etc. so that textual information can be input and output. An example of a system console would be the DOS Prompt utility. To make use of a console, an application program can be launched by specifying it's fully qualified path name (input). Thereafter, any textual output information coming over the standard streams, such as System.err and System.out in the Java development, will be displayed in the visual display window.

As used herein, the term "console" refers to a display window and storage that to allows textual information to be displayed in a GUI environment. Typically, the console is scrollable so that messages can be viewed that aren't immediately visible.

As used herein, the term "standard stream" refers to an informational stream provided by the development environment like System.err and stderr for error information designed to be displayed on a CRT display, a display window in a GUI, such as a system console, or an IDE. Also, System.out and stdout for general output information are considered standard streams.

Figure 1:
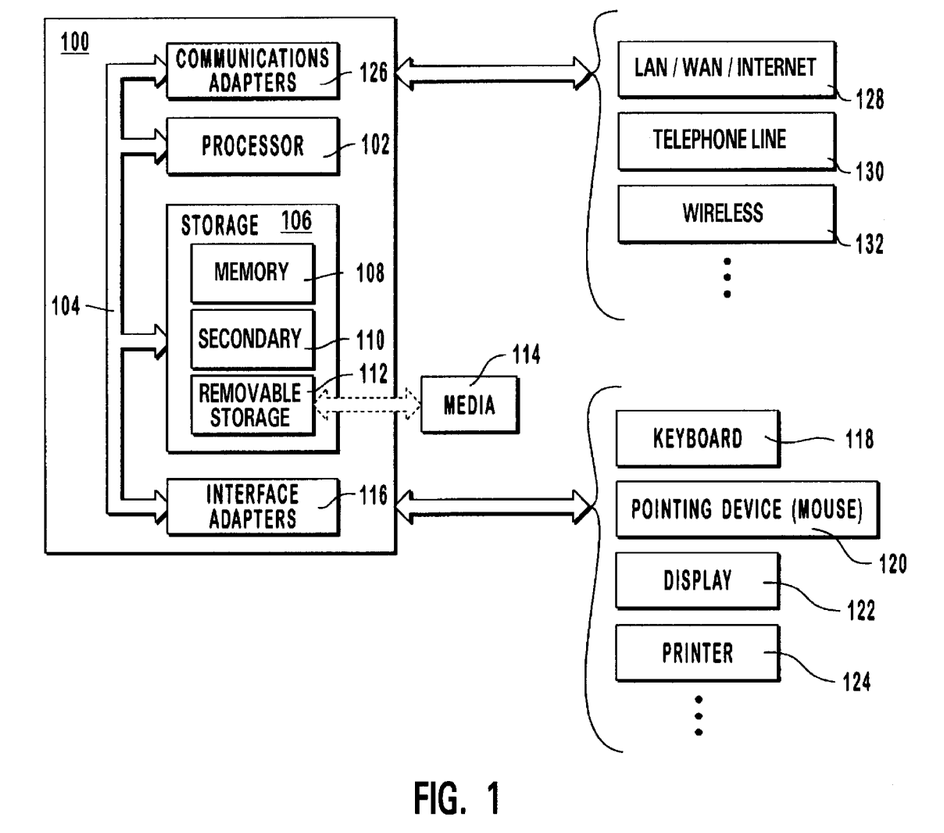
FIG. 1 is a block diagram of a computing device, such as a workstation, wherein the present invention may be practiced.

FIG. 1 is a block diagram of a computing device, such as a workstation, wherein the present invention may be practiced. The environment of FIG. 1 comprises a single representative computing device 100, such as a personal computer, workstation, hand-held computer, information appliance, etc., including related peripheral devices. The workstation 100 includes a microprocessor 102 or equivalent processing capability and a bus 104 to connect and enable communication between the microprocessor 102 and the components of the computing device 100 in accordance with known techniques. Note that in some computing devices there may be multiple processors incorporated therein.

The microprocessor 102 communicates with storage 106 via the bus 104. Memory 108, such as Random Access Memory (RAM), Read Only Memory (ROM), flash memory, etc. is directly accessible while secondary storage device 110, such as a hard disk, and removable storage device 112, such as a floppy diskette drive, CD ROM drive, tape storage, etc. is accessible with additional interface hardware and software as is known and customary in the art. The removable storage device 112 will have associated therewith an appropriate type of removable media 114, such as a diskette, CD, tape reel or cartridge, solid state storage, etc. that will hold computer useable data and is a form of computer useable medium. Note that a computing device 100 may have multiple memories (e.g., RAM and ROM), secondary storage devices, and removable storage devices (e.g., floppy drive and CD ROM drive).

The computing device 100 typically includes a user interface adapter 116 that connect the microprocessor 102 via the bus 104 to one or more interface devices, such as keyboard 118, a mouse or other pointing device 120, a display 122 (such as a CRT monitor, LCD screen, etc.), a printer 124, or any other user interface device, such as a touch sensitive screen, digitized entry pad, etc. Note that the computing device 100 may use multiple user interface adapters in order to make the necessary connections with the user interface devices.

The computing device 100 may also communicate with other computing devices, computers, workstations, etc. or networks thereof through a communications adapter 126, such as a telephone, cable, or wireless modem, DSL adapter, Local Area Network (LAN) adapter, or other communications channel. This gives the computing device direct access to networks 128 (LANs, Wide Area Networks (WANs), the Internet, etc.), telephone lines 130 that may be used to access other networks or computers, wireless networks 132, such cellular telephone networks, and other communication mechanisms. Note that the computing device 100 may use multiple communication adapters for making the necessary communication connections (e.g., a telephone modem card and a Cellular Digital Packet Data (CDPD). The computing device 100 may be associated with other computing devices in a LAN or WAN, or the computing device can be a client or server in a client/server arrangement with another computer, etc. All these configurations, as well as the appropriate communications hardware and software, are known in the art.

As will be understood by one of ordinary skill in the art, computer programs such as that described herein are typically distributed as part of a computer program product that has a computer useable media or medium containing the program code. Therefore, "media", "medium", "computer useable medium", or "computer useable media", as used herein, may include a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems out of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "on" a medium is intended to encompass the above and all equivalent ways in which the instructions or software is associated with a computer useable medium.

For simplicity, the term "computer program product" is used to refer to a computer useable medium, as defined above, which bears or has embodied thereon any form of software or instructions to enable a computer system (or multiple cooperating systems) to operate according to the above-identified invention.

The term "data structure" refers to a particular organization of meaningful data values that can be used in a predetermined fashion. For example, a network packet has a variety of different data elements that are used and accessed by communications networks and computer nodes for transporting the packet between different computer systems. The packet, as described above, is a data structure and has a tangible embodiment in a computer useable medium when stored in a file, when loaded into system memory, when transported across a communications network, etc. in the same fashion as a computer program product.

It will be likewise appreciated that the computer hardware upon which the invention is effected contains one or more processors, operating together, substantially independently, or distributed over a network, and further includes memory for storing the instructions and calculations necessary to perform the invention.

Figure 2:
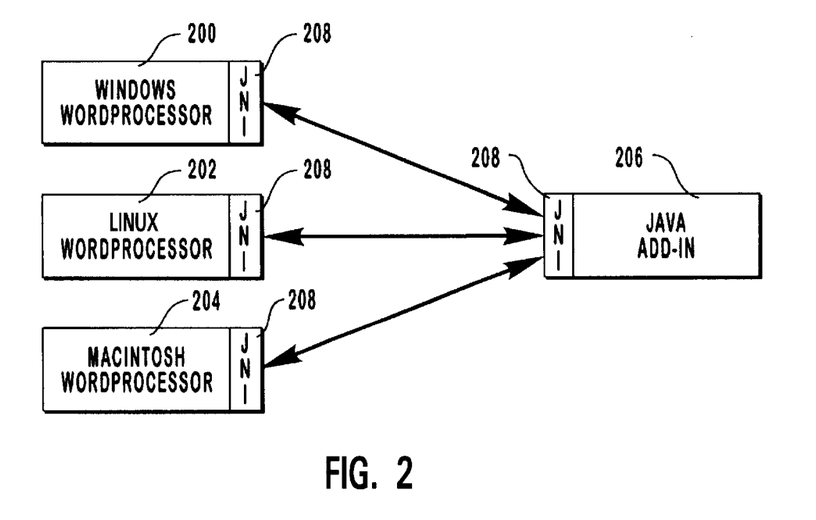
FIG. 2 is an architecture diagram showing multi-platform software "add-in" written in Java that can be used with various native application software programs (all software executing on a computing device, such as that shown in FIG. 1) using the Java Native Interface (JNI) where the present invention provides benefit.

Referring now to FIG. 2, an architecture diagram showing multi-platform software "add-in" written in Java that can be used with various native application software programs. Although the Java environment is designed to utilize the same implementation code across different hardware platforms, there are occasions for a program written in Java to have need for access to platform specific or "native" code. Likewise, there are times when a platform-specific program may have need to access functionality implemented in Java. This can be done through the Java Native Interface (JNI). For details on JNI, one reference is *The Java™ Native Interface: Programmer's Guide and Specification* written by Sheng Liang and published by Addison Wesley Longman, Inc., June 1999.

As shown, three different platform specific wordprocessing programs are running on three different computing platforms, namely, a wordprocessing application program 200 written to a Microsoft Windows operating system platform, a wordprocessing application program 202 written to a Linux operating system platform, and a wordprocessing application program 204 written to an Apple Macintosh operating system platform. Each of these platforms will be running on hardware, such as computing device 100 described previously.

An "add-in" application program 206 written in the Java language can be used with each of the wordprocessing application programs without modification using the JNI interface 208 using conventional techniques known in the art. For example, the "add-in" application program 206 may provide support for adding animation to the text of a document or providing the ability to integrate verbal information to a wordprocessing file.

When integrating the"add-in" application program 206 using JNI, the problem solved by the present invention exhibits itself. The Java System.err and System.out to output streams become lost and information (such as error or debugging information) placed thereon becomes unavailable and therefore lost. In the Java environment, the information from a "stack trace" command can be very useful in debugging. This information can easily be lost since it is placed on the System.err standard stream.

Figure 3:
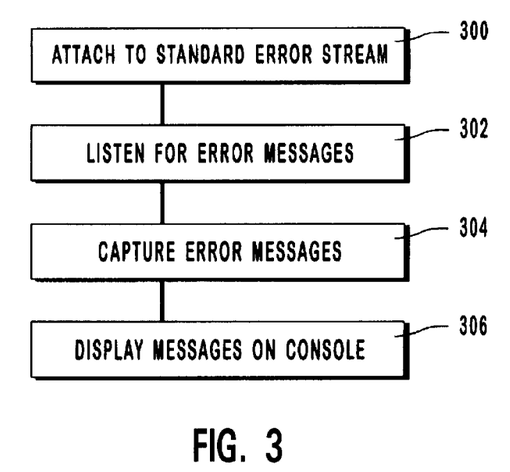
FIG. 3 is a flow chart of the processing steps taken to incorporate one embodiment of the present invention.

Referring now to FIG. 3, a flow chart of the processing steps taken to incorporate one embodiment of the present invention is shown. At step 300, an attachment is made to the error stream or other standard stream such as System.err and System.out in the Java language, stderr or stdout in the C/C++ language, etc. One way to make this attachment is to redirect the standard stream to a defined stream so that the information will be accessible.

At step 302, a program module will listen for errors or other desirable information coming across the standard stream. Listening may be done in conjunction with a filtering implementation described below.

At step 304, desired information will be captured or otherwise saved. Generally, all information is captured, though some implementations may do some sort of filtering for only certain types of information.

Finally, at step 306, the captured information is displayed on a console with a window or placed into a file. At this point, the information over the standard stream that otherwise would be lost is now accessible.

Figure 4:
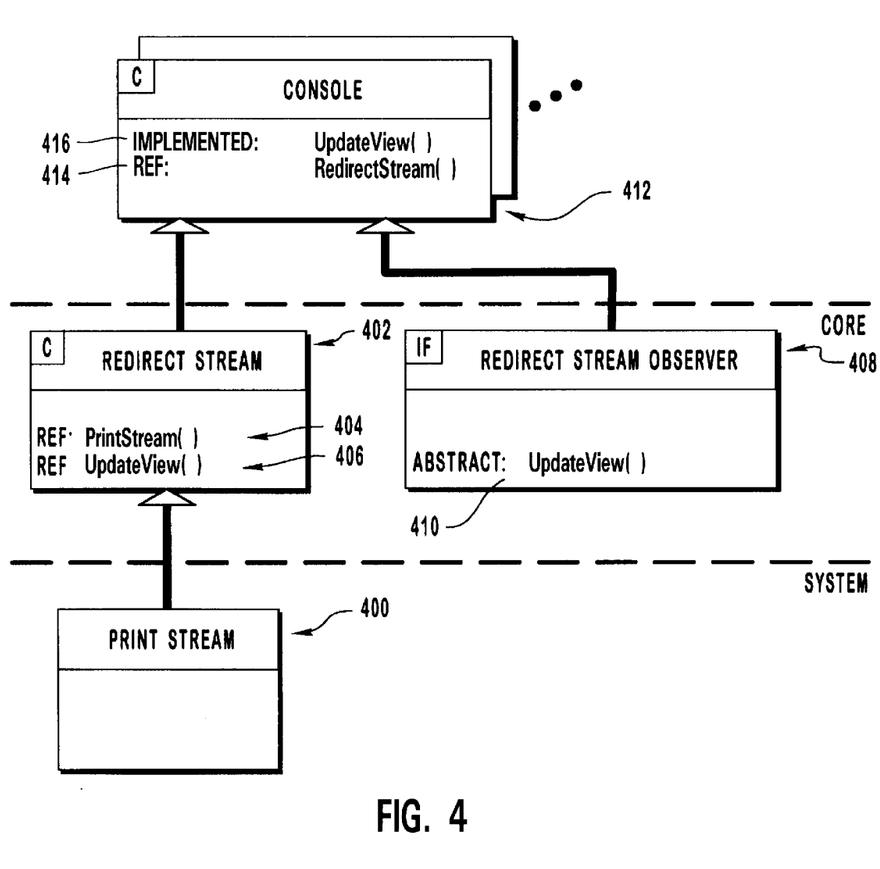
FIG. 4 is a class diagram used to implement of one embodiment of the present invention showing the relationship between the classes.

Referring now to FIG. 4, a class diagram used to implement one embodiment of the present invention showing the relationship between the classes is shown. Since the System.err and the System.out streams in the Java environment are of class to "PrintStream", the system PrintStream class 400 is extended by the RedirectStream class 402. The implementation of the RedirectStream class 402 overwrites all the methods of the PrintStream class so that it can manage the data written to the stream directly. It is necessary to inherit from the PrintStream class since System.err is defined as type PrintStream.

The RedirectStream class 402 will eventually have access to the System.err or System.out data and will make reference to the method Update View 406 in order to have that data made available through a console or a file. One way of gaining access is to simply reassign the standard stream (e.g., System.err or System.out) so that the data placed thereon now comes through the RedirectStream class 402.

Note that an object instantiated from the RedirectStream class 402 and executing on computer, such as computing device 100 described previously, constitutes a means for attaching and listening to data originally placed in System.err. Other means may include any form of program code, directives, subroutines, etc. that cause a computer to act in similar fashion so that the System.err data is monitored or observed and can therefore be freely manipulated.

The RedirectStreamObserver interface 408 in composed solely of an abstract definition 410 of the method Update View. This allows the developer to implement the method to handle the captured data in the manner desired. Contemplated ways of doing this include, but should not be limited to, placing the data onto a console for view on a display or into a file stored on secondary storage. Those skilled in the art will recognize that there a variety of ways of making the data that would otherwise be lost accessible.

Together, the RedirectStream class 402 and the RedirectStreamInterface 408 make up a "core" portion that can be delivered in object code (compiled byte code in Java). This core portion can be used to handle the data as desired by creating a class that extends from the core portion and implements the Update View method.

One example of a class utilizing the core portion is the Console class 412 that extends the RedirectStream class 402 and implements the RedirectStreamObserver interface 408. The extension of the RedirectStream class 402 provides access (through a reference 414 to the RedirectStream class 402) to information placed on System.err and System.out and the implementation of the RedirectStreamObserver interface 408 has an implementation 416 of the Update View method. In other words, the Console class has the program code for handling the data originally directed to the System.err or System.out stream and making it accessible.

Note that an object instantiated from the Console class 412 and executing on computer, such as computing device 100 described previously, constitutes a means for capturing and making available data originally placed in System.err. Other means may include any form of program code, directives, subroutines, etc. that cause a computer to act in similar fashion so that the System.err data is not lost.

Note that those skilled in the art will recognize other ways of implementing the present invention besides the above described classes. For example, all of the functional steps could be consolidated into a single class that extends from the PrintStream class 400.

Figure 5:
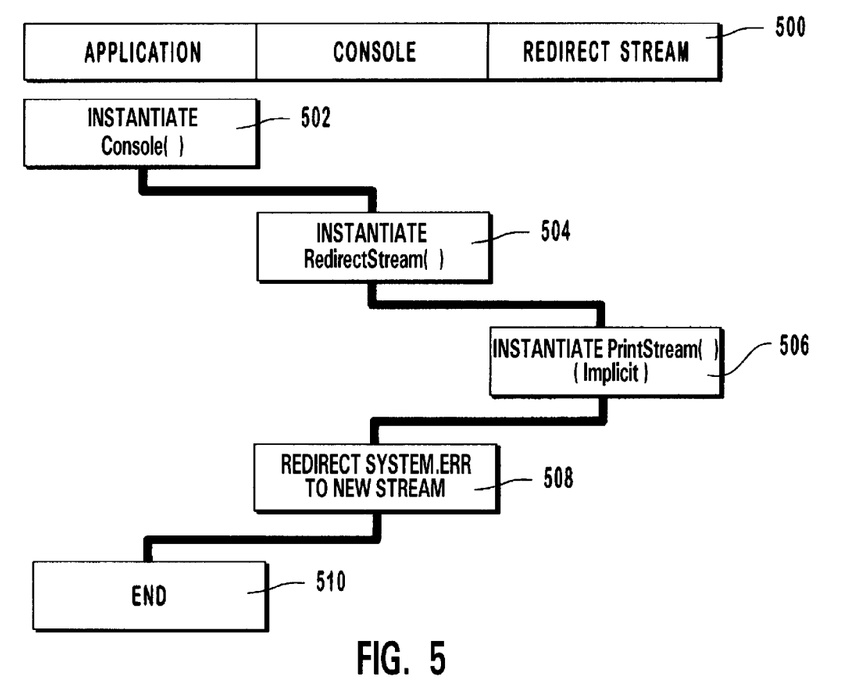
FIG. 5 is a flow chart of the processing steps taken when initializing and instantiating the classes of FIG. 4 according to one embodiment of the present invention.

Referring now to FIG. 5, a flow chart of the processing steps taken when initializing and instantiating the classes of FIG. 4 is shown. The bar 500 is used to illustrate in what software module execution is taking place. Initially, an application program will instantiate the console class 412 at step 502. This is the only action that needs to be taken by the application program developer in order to take advantage of the benefits of the present invention and is one line of operative code.

As part of the console class 412 instantiation, a directive to instantiate the RedirectStream class 402 takes place at step 504. Likewise, the RedirectStream class 402 will cause an implicit instantiation of the PrintStream class 400 at step 506. An implicit instantiation of a class occurs when another class inherits from that class. An explicit instantiation is one that is directed by the programmer through a line of code or other means. In this embodiment, since all of the methods of the PrintStream class 400 were overwritten as part of the RedirectStream class 402, only the constructor of the PrintStream class 400 is ever used (i.e., during the implicit instantiation shown at step 506).

At this point, a new stream exists as a result of the instantiation of the RedirectStream class 402 and PrintStream class 400 so that the console can redirect the existing System.err (or System.out) to the new stream. Now, data will not be lost but rather processed as part of the new stream as will be explained hereafter. Finally, the initialization ends at step 510.

Figure 6:
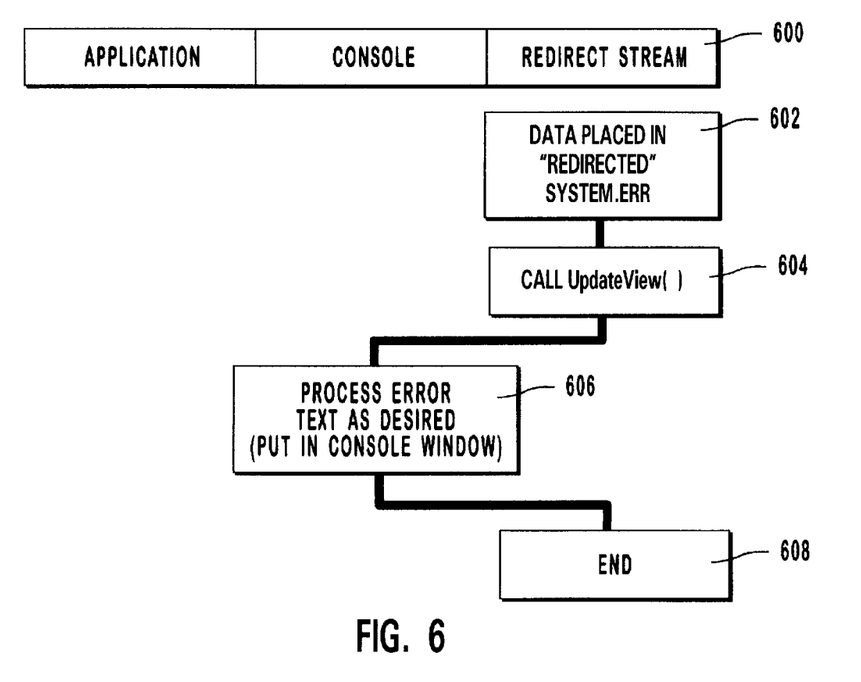
FIG. 6 is a flow chart of the processing steps taken when data is processed by one embodiment of the present invention as implemented using the classes of FIG. 4.

Referring now to FIG. 6, a flow chart of the processing steps taken when data is processed using the classes of FIG. 4 is shown. The bar 600 is used to illustrate in what software module execution is taking place. At step 602, data from System.err (or System.out) is placed in the new redirected stream. As part of the processing of the data, a call is made to the Update View method implemented in the Console class 412 at step 604.

The console class 412 Update View method implementation code will process the error or other text as implemented at step 606. This will usually be done by putting the data into a console window that is displayed and can be read by the user. Alternatively, it can be placed into a file that may be read later using appropriate software known to those in the art.

Once standard stream information is accessible through the RedirectStream class 402, it can be utilized. For example, errors caught in Java that have the "stack trace" API call invoked or executed will place the invocation stack showing where the processing was located at the time of the exception onto System.err. This information can then be used in debugging the program when the program is deployed in the field outside of an IDE. Note that but for the present invention this standard stream information would be lost.

Those skilled in the art will recognize variations that do not depart beyond the scope of the present invention and are therefore contemplated within the scope of the claims presented hereafter. For example, System.err data could simply be monitored rather than redirected, or some specific action taken upon finding any data present on the standard stream, such as sending an email to tech support to report an error or page an attendant regarding the error situation on the system. Since there could be multiple observers listening or monitoring the standard stream, the same data could be handled in different ways, such as displayed on a console and simultaneously placed in a file.

One scenario might find error data placed into a file, an attendant paged, emailed, or otherwise alerted to the error. The attendant could even be sent a portion or all of the error data from the standard stream to assist in the quick resolution. Furthermore, a tech support person or other attendant could be rendering assistance from a remote location and still receive timely, information that an error occurred as well as some indication of what the error was without any intervention by the actual operator or user of the particular software application. Again, those skilled in the art will recognize many other practical applications using the present invention.

While the preferred embodiment of the present invention has been described in detail, it will be understood that modification and adaptations to the embodiment(s) shown may occur to one of skill in the art without departing from the scope of the present invention as set forth in the following claims. Thus, the scope of this invention is to be construed according to the appended claims and not just to the specifics disclosed in the exemplary embodiment or embodiments.

References in the claims to an element in the singular is not intended to mean "one and only" unless explicitly so stated, but rather "one or more." All structural and function equivalents to: the elements of the above-described exemplary embodiment that are currently known or later come to be known to those of ordinary skill in the art are expressly incorporated herein by reference and are intended to be encompassed by the present claims. No element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or "step for."

What is claimed is:

1. A method for capturing textual output information from a standard stream of a Java application program written using the Java language and making the textual output information that would otherwise be lost accessible to a user of the Java application program, the method comprising:
   redirecting the contents of System.err in a Java application program;
   capturing the error messages from System.err; and
   making available the captured error messages that would otherwise be lost to a user on a console provided with the Java application program.

2. A method for capturing textual output information from a standard stream of an application program that would otherwise be lost and making the captured textural output information accessible to a user of the application program, the method comprising:
   attaching to a standard stream of an application program that carries textual output information;
   listening for textual output information from the attachment to the standard stream;
   capturing the textual output information; and
   making available the captured textual output information that would otherwise be lost to a user.

3. A method as recited in claim 2 wherein attaching to a standard stream comprises redirecting the standard stream.

4. A method as recited in claim 2 wherein the captured textual output information is made available to a user in a log file that contains the captured textual output information.

5. A method as recited in claim 2 wherein the captured textual output information is made available to a user through a console having a display window that shows the captured textual output information.

6. A method as recited in claim 2 wherein the captured textual output information is made available to a user through a console having a display window that shows the captured textual output information and wherein the console is optionally visible at the control of the user.

7. A method as recited in claim 2 wherein the application program is written in the JAVA programming language.

8. A method as recited in claim 2 wherein the standard stream is selected from the group consisting of System.err, System.out, stderr, and stdout.

9. A method for capturing textual output information from a standard stream of an application program that would otherwise be lost and making the information accessible to a user of the application program, the method comprising:
   attaching to a standard stream of an application program that carries textual output information, the attaching including:
   redirecting the standard stream;
   listening for textual output information from the attachment to the standard stream;
   capturing the textual output information; and
   making available the captured textual output information that would otherwise be lost to a user.

10. A method as recited in claim 9 wherein the captured textual output information is made available to a user in a log file that contains the captured textual output information.

11. A method as recited in claim 9 wherein the captured textual output information is made available to a user through a console having a display window that shows the captured textual output information.

12. A method as recited in claim 9 wherein the captured textual output information is made available to a user through a console having a display window that shows the captured textual output information and wherein the console is optionally visible at the control of the user.

13. A method as recited in claim 9 wherein the application program is written in the JAVA programming language.

14. A method as recited in claim 9 wherein the standard stream is selected from the group consisting of System.err, System.out, stderr, and stdout.

15. An article of manufacture including computer readable instructions executable by a computer, the instructions embodying logic for performing a textural capture method comprising:
   attaching to a standard stream of an application program that carries textual output information;
   listening for textual output information from the attachment to the standard stream;
   capturing the textual output information; and
   making available the captured textual output information that would otherwise be lost to a user.

16. A computer program product comprising:
   a computer usable medium;
   computer readable instructions embodied on said computer useable medium for capturing textual output information from a standard stream of an application program and making the textual output information that would otherwise be lost accessible to a user of the application program, the instructions directing a computer to perform the steps of:

attaching to a standard stream of an application program that carries textual output information;

listening for textual output information from the attachment to the standard stream;

capturing the textual output information; and making available the captured textual output information that would otherwise be lost to a user.

17. A computer program product as recited in claim 16 wherein attaching to a standard stream comprises redirecting the standard stream.

18. A computer program product as recited in claim 16 wherein the captured textual output information is made available to a user in a log file that contains the captured textual output information.

19. A computer program product as recited in claim 16 wherein the captured textual output information is made available to a user through a console having a display window that shows the captured textual output information.

20. A computer program product as recited in claim 16 wherein the captured textual output information is made available to a user through a console having a display window that shows the captured textual output information and wherein the console is optionally visible at the control of the user.

21. A computer program product as recited in claim 16 wherein the application program is written in the JAVA programming language.

22. A computer program product as recited in claim 16 wherein the standard stream is selected from the group consisting of System.err, System.out, stderr, and stdout.

23. A computer program product comprising:

a computer usable medium;

computer readable instructions embodied on said computer useable medium for capturing textual output information from a standard stream of an application program and making the textual output information that would otherwise be lost accessible to a user of the application program, the instructions directing a computer to perform the steps of:

attaching to a standard stream of an application program that carries textual output information, the attaching including redirecting the standard stream;

listening for textual output information from the attachment to the standard stream;

capturing the textual output information; and making available the captured textual output information that would otherwise be lost to a user.

24. A computer program product as recited in claim 23 wherein the captured textual output information is made available to a user in a log file that contains the captured textual output information.

25. A computer program product as recited in claim 23 wherein the captured textual output information is made available to a user through a console having a display window that shows the captured textual output information.

26. A computer program product as recited in claim 23 wherein the captured textual output information is made available to a user through a console having a display window that shows the captured textual output information and wherein the console is optionally visible at the control of the user.

27. A computer program product as recited in claim 23 wherein the application program is written in the JAVA programming language.

28. A computer program product as recited in claim 23 wherein the standard stream is selected from the group consisting of System.err, System.out, stderr, and stdout.

29. A system for capturing textual output information from a standard stream of an application program and making the textual output information that would otherwise be lost accessible to a user of the application program, the system comprising:

means for attaching to a standard stream of an application program that carries textual output information;

means for listening for textual output information from the attachment to the standard stream;

means for capturing the textual output information; and means for making available the captured textual output information that would otherwise be lost to a user.

30. A system as recited in claim 29 wherein the means for attaching to a standard stream comprises redirecting the standard stream.

31. A system as recited in claim 29 wherein the captured textual output information is made available to a user in a log file that contains the captured textual output information.

32. A system as recited in claim 29 wherein the captured textual output information is made available to a user through a console having a display window that shows the captured textual output information.

33. A system as recited in claim 29 wherein the captured textual output information is made available to a user through a console having a display window that shows the captured textual output information and wherein the console is optionally visible at the control of the user.

34. A system as recited in claim 29 wherein the application program is written in the JAVA programming language.

35. A system as recited in claim 29 wherein the standard stream is selected from the group consisting of System.err, System.out, stderr, and stdout.

36. A system for capturing textual output information from a standard stream of an application program and making the textual output information that would otherwise be lost accessible to a user of the application program, the system comprising:

means for attaching to a standard stream of an application program that carries textual output information, the means including redirecting the standard stream;

means for listening for textual output information from the attachment to the standard stream;

means for capturing the textual output information; and means for making available the captured textual output information that would otherwise be lost to a user.

37. A system as recited in claim 36 wherein the captured textual output information is made available to a user in a log file that contains the captured textual output information.

38. A system as recited in claim 36 wherein the captured textual output information is made available to a user through a console having a display window that shows the captured textual output information.

39. A system as recited in claim 36 wherein the captured textual output information is made available to a user through a console having a display window that shows the captured textual output information and wherein the console is optionally visible at the control of the user.

40. A system as recited in claim 36 wherein the application program is written in the JAVA programming language.

41. A system as recited in claim 36 wherein the standard stream is selected from the group consisting of System.err, System.out, stderr, and stdout.

* * * * *

UNITED STATES PATENT AND TRADEMARK OFFICE
CERTIFICATE OF CORRECTION

PATENT NO. : 6,715,109 B1
DATED : March 30, 2004
INVENTOR(S) : Charlet et al.

It is certified that error appears in the above-identified patent and that said Letters Patent is hereby corrected as shown below:

Column 9,
Line 56, please delete "textural" and substitute therefor -- textual --; and, Column 10,
Line 49, please delete "textural" and substitute therefor -- textual --.

Signed and Sealed this

Twenty-first Day of June, 2005

JON W. DUDAS
*Director of the United States Patent and Trademark Office*